United States Patent
Merdinger et al.

(10) Patent No.: US 12,545,106 B2
(45) Date of Patent: Feb. 10, 2026

(54) MODULAR VEHICLE DASHBOARD

(71) Applicant: Doroni Aerospace Inc., Coral Springs, FL (US)

(72) Inventors: Doron Merdinger, Parkland, FL (US); Czar Balangue, London (GB)

(73) Assignee: Doroni Aerospace Inc., Coral Springs, FL (US)

( * ) Notice: Subject to any disclaimer, the term of this patent is extended or adjusted under 35 U.S.C. 154(b) by 79 days.

(21) Appl. No.: 18/583,994

(22) Filed: Feb. 22, 2024

(65) Prior Publication Data

US 2025/0269722 A1 Aug. 28, 2025

(51) Int. Cl.
*B60K 35/22* (2024.01)
*B64D 43/00* (2006.01)

(52) U.S. Cl.
CPC .............. *B60K 35/22* (2024.01); *B64D 43/00* (2013.01); *B60K 2360/1438* (2024.01); *B60K 2360/166* (2024.01); *B60K 2360/816* (2024.01)

(58) Field of Classification Search
CPC .............. B60K 35/22; B60K 2360/166; B60K 2360/816; B60K 2360/1438
USPC .......................................................... 701/1
See application file for complete search history.

(56) References Cited

U.S. PATENT DOCUMENTS

| | | | | |
|---|---|---|---|---|
| 10,654,489 B2* | 5/2020 | Tertoolen | ................. | G06F 3/013 |
| 10,891,921 B2* | 1/2021 | Mittal | .................... | G06F 9/4406 |
| 11,220,182 B1* | 1/2022 | Fisker | .................... | B60K 35/60 |
| 2014/0361569 A1* | 12/2014 | Crepaldi | ............. | B60R 11/0252 |
| | | | | 296/37.12 |
| 2018/0232097 A1* | 8/2018 | Kneuper | .................. | G08G 5/53 |
| 2018/0335921 A1* | 11/2018 | Karunamuni | ....... | G06F 3/04842 |
| 2018/0335939 A1* | 11/2018 | Karunamuni | ........... | G06F 9/445 |
| 2019/0361694 A1* | 11/2019 | Gordon | .................... | G06F 9/452 |
| 2020/0094678 A1* | 3/2020 | Gaffar | .................... | B60K 35/10 |
| 2020/0218443 A1* | 7/2020 | Narayan | ................ | B60K 35/22 |
| 2021/0023949 A1* | 1/2021 | Marietta | ................ | B60K 35/53 |
| 2021/0206270 A1* | 7/2021 | Diboine | ................ | B60K 35/60 |
| 2022/0135228 A1* | 5/2022 | Morrison | ............... | G05D 1/652 |
| | | | | 701/3 |
| 2024/0253462 A1* | 8/2024 | Hoover | .................. | B60K 35/00 |

(Continued)

FOREIGN PATENT DOCUMENTS

| | | | | | |
|---|---|---|---|---|---|
| CA | 2953587 A1 | * | 12/2016 | ............. | B60K 37/00 |
| CA | 3002856 A1 | * | 7/2017 | ........... | G01C 21/362 |
| CN | 109143576 B | * | 1/2021 | ............. | G02B 30/10 |

(Continued)

*Primary Examiner* — Atul Trivedi
(74) *Attorney, Agent, or Firm* — James P. Demers; Cittone, Demers & Arneri LLP

(57) ABSTRACT

A touchscreen vehicle dashboard is provided, in which are mounted a plurality of tablet computers. The tablets are reversibly mounted, so that they are readily removed and easily re-installed or replaced. The use of commercial tablet computers reduces the cost of the vehicle, and the cost of repairs, relative to comparable vehicles having custom command and control systems. Through a graphical user interface, the tablets report the output of the vehicle's sensors, and enable the operator to operate various vehicle systems via touch controls. As a safety feature, each tablet can be programmed to assume the role of any other tablet, providing redundancy that is particularly valuable in aircraft applications.

15 Claims, 3 Drawing Sheets

(56) References Cited

U.S. PATENT DOCUMENTS

2025/0214440 A1* 7/2025 Ruelke .................. B60K 35/29

FOREIGN PATENT DOCUMENTS

| CN | 112261547 | A | * | 1/2021 | ............. B60K 35/25 |
|---|---|---|---|---|---|
| CN | 112289245 | A | * | 1/2021 | ............ G09F 21/048 |
| CN | 213120569 | U | * | 5/2021 | |
| CN | 115033314 | A | * | 9/2022 | ............. G06F 9/451 |
| CN | 217532565 | U | * | 10/2022 | ............ B60R 21/203 |
| CN | 118363487 | A | * | 7/2024 | ............. G06F 3/015 |
| DE | 202017105761 | U1 | * | 3/2018 | ............ G06F 3/0488 |
| DE | 102021102810 | A1 | * | 9/2021 | ............. B60K 37/20 |
| EP | 3385124 | A1 | * | 10/2018 | ......... B60R 11/0235 |
| EP | 3742218 | A1 | * | 11/2020 | ............. B60K 35/81 |
| EP | 4491429 | A1 | * | 1/2025 | ............ B60K 35/223 |
| FR | 3126365 | A1 | * | 3/2023 | ............. B60K 35/50 |
| GB | 2412281 | A | * | 9/2005 | ............ H01Q 1/3233 |
| GB | 2510436 | A | * | 8/2014 | ............. G06F 1/1632 |
| JP | 2009505098 | A | * | 2/2009 | ............ G06F 1/1686 |
| JP | 2009533692 | A | * | 9/2009 | ............... G01S 19/49 |
| JP | 2020132137 | A | * | 8/2020 | ............. B60K 35/29 |
| JP | 2020181279 | A | * | 11/2020 | |
| JP | 7168104 | B1 | * | 11/2022 | ............... G09G 5/36 |
| JP | 7460870 | B2 | * | 4/2024 | ............. B60K 35/81 |
| WO | WO-2018041999 | A1 | * | 3/2018 | ......... G01C 21/3661 |
| WO | WO-2021261535 | A1 | * | 12/2021 | ............. B60K 35/28 |
| WO | WO-2022118333 | A1 | * | 6/2022 | ............. B60K 35/80 |

\* cited by examiner

MODULAR VEHICLE DASHBOARD

FIELD OF THE INVENTION

This invention relates to vehicle-driver interfaces, in particular to dashboards employing touch-screen displays and controls.

BACKGROUND

Human-operated vehicles typically incorporate a variety of systems that enable the driver and passengers to interface with the vehicle, by providing a means for monitoring vehicle conditions and controlling various vehicle functions. These interface systems usually provide visual, tactile and/or audible feedback. Functions and conditions that may be monitored and/or controlled by the interface system include climate controls, entertainment system controls (e.g., audio source, radio station, balance, volume, etc.), and a navigation system.

Modern automobiles, in particular electric and hybrid vehicles, increasingly employ digital technologies for both instrument displays and vehicle control functions. Dash-mounted flat-panel displays and touch-screen controls are becoming common features. Similar technologies are becoming more common in other vehicles, including ships and aircraft.

The displays and control panels currently in use are usually custom-built for each application, and consequently are expensive to manufacture, repair, and replace. In commercial aircraft, there is a need for redundant systems, which further increases the expense. It is not unusual for a modern motor vehicle to have dozens of different electronic control units (ECUs) for the various electrical subsystems of the vehicle, and modern aircraft contain hundreds of such units, with two-fold or three-fold redundancy of critical systems. These units are often located in the engine compartment of gas- or diesel-fueled vehicles, a harsh environment that requires exceptional resistance to heat and vibration; furthermore, their embedded software continues to increase in its complexity and sophistication, all of which comes at significant expense.

There is a need for flat-panel displays and touch-screen controls that can be standardized and mass-produced, reducing manufacturing, repair, and maintenance costs. There is also a need for centralized electronic control of vehicle subsystems.

SUMMARY OF THE INVENTION

The present invention provides a system of multiple touch-panel tablet computers, reversibly mounted in the dashboard of a vehicle cabin or aircraft cockpit. The tablets are preferably identical in construction, and can readily be swapped out for a replacement tablet in the event that repair or maintenance is required. Identical construction, or at least identical programming, enables one tablet to take over the functions of another in the event of a failure, thereby providing redundancy. The tablets may be programmed to carry out the functions of many or all of the ECUs found in conventional vehicles. In preferred embodiments, the tablets are capable of high-level operations like image analysis of camera inputs, lane assist, and various levels of Driver Assistance Technologies (DAT) for partially autonomous operation of the vehicle.

DETAILED DESCRIPTION OF THE INVENTION

Figure 1:
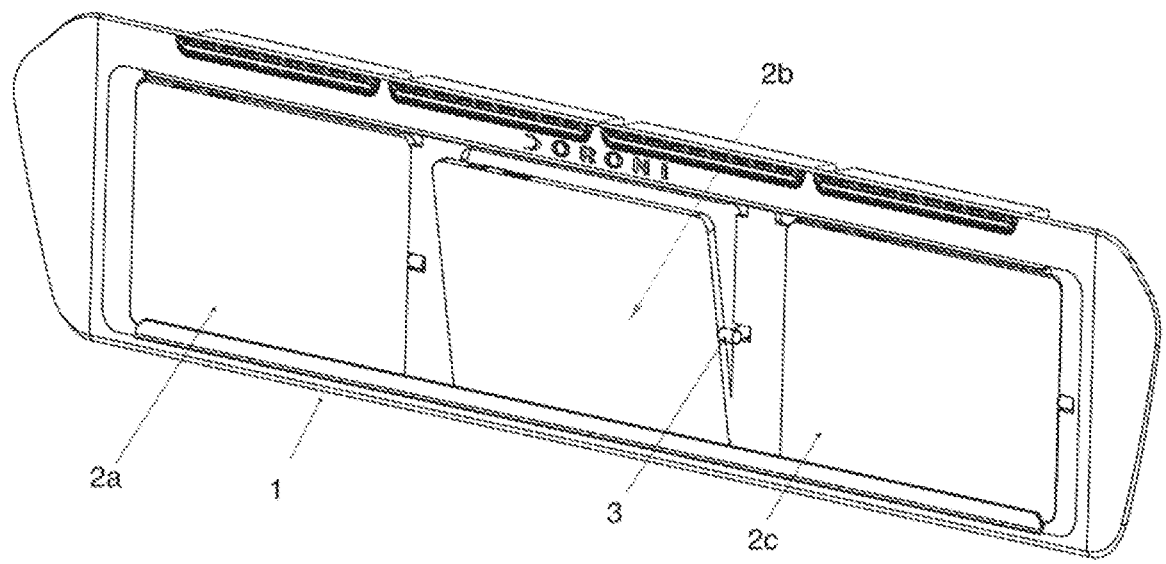
FIG. 1 is a perspective view of a dashboard containing three tablet computers.

As used herein, the term "vehicle" refers to any form of transportation operated by humans, including but not limited to automobiles, trucks, buses, ships, and aircraft. The terms "tablet" and "tablet computer" refer to flat, generally rectangular hand-held general-purpose computers having a flat touch-screen covering a majority of one surface. By way of non-limiting examples, commercial devices marketed under the trademarks Samsung Galaxy™ Tab, Apple iPad™, and Microsoft Surface™ tablets, and the like, are suitable for use in the invention, as are purpose-built devices. The term "dashboard" refers not only to the dashboards found in commercially-available automobiles and trucks, but also to the instrument panels found in aircraft cockpits, and the console units found on the bridge of a ship. "Sensors" include, but are not limited to, temperature sensors (e.g. thermocouples), voltage and current sensors, fuel level sensors, cameras, LIDAR units, RADAR units, GPS units, inertial navigation systems, position sensors for seats, windows, and flight control surfaces, and the sensing elements of accelerometers, odometers, and tachometers.

"Reversibly mounted" refers to tablets held in place by easily-reversed means such as clamps, clips, cams, magnets, removable bezels, hook-and-loop fasteners, quarter-turn fasteners, and the like. Broadly, reversibly mounted tablets are those which are configured to be removed and re-installed by hand, with or without the use of a simple tool, and without disassembly of the dashboard itself. Removable bezels may likewise be affixed by any of the above methods.

The present invention provides a vehicle dashboard in which two, three, or more tablet computers are reversibly mounted. In one embodiment of the invention, the tablets are connected via data ports to the vehicle's sensors and mechanical and electrical systems, and are configured to send control signals and receive data signals from those systems. In this embodiment, the tablets take over the functions of many or all of the vehicle's electronic control units (ECUs), including but not limited to the engine control module (ECM), powertrain control module (PCM), transmission control module (TCM), brake control module (BCM or EBCM), central control module (CCM), central timing module (CTM), general electronic module (GEM), body control module (BCM), and suspension control module (SCM). Appropriately programmed tablet computers are capable of carrying out all of those functions, and being located in the passenger cabin, cockpit, or ship's bridge, they do not require the hardening needed to survive in an engine compartment, high altitude pressures and temperatures, salt water, or other harsh environments.

In other embodiments, the tablets are in communication with the vehicle's ECUs, from which they receive digital signals encoding the sensor readings and to which they send commands. The data will typically be carried on a Controller Area Network (CAN) bus, and the tablets will be configured to decode standard (ISO 11898-1) CAN frames and carry out the necessary functions (error handling, arbitration, etc.) In these embodiments, the tablets' primary function is to provide a user interface.

The invention provides a method and apparatus for controlling a plurality of vehicle functions, for example the adjustment of environmental controls, cruise control, navigation, communication and auto-pilot settings, using a graphical user interface (GUI) implemented on the touchscreens of the tablet computers. In automobiles, the usual information, such as vehicle speed, energy reserves, and engine and transmission settings and performance data may be displayed. In an aircraft, the positions of flaps, spoilers, ailerons, rudder, and other control surfaces may be controlled and/or displayed, along with avionics data such as airspeed, altitude, attitude, and an artificial horizon. Maps and radar displays are also readily implemented on the tablets. On the bridge of a ship, the functions of the telegraph, gyro compass, radar screen display, and NAVTEX and AIS receivers can all be carried out with the touchscreens of the tablets. The tablets' clocks are suitable substitutes for a mechanical GMT chronometer, and the GMT time they provide can be directly input into navigational calculations carried out by installed software. Digital equivalents of the course recorder and electromagnetic log are also enabled by the use of the tablets.

The GUI is activated and operated by touching a virtual controls on the tablet screen. Virtual controls include, but are not limited to, toggles, timed hold-down, and touch-and-drag sliders presented on the screen, which are preferably intuitively linked by graphical elements, and/or by text identifiers, to the particular vehicle function being controlled or displayed. In certain embodiments, the screen may be navigated with a separate touchpad or joystick. A plurality of different GUI screens are available and selectable by the user, each presenting logical collections of related controls and data displays. The tablets are preferably capable of wireless Internet access, and have appropriate browser software installed.

The software that manages the GUI and sends and receives data as required by the user is resident in solid-state memory, and is executed by processors, within the tablet computers. In certain embodiments, this may obviate the need for a customized central processor installed in the vehicle. The solid-state memory will preferably carrying vehicle-specific identifiers, usage and maintenance records, and other information required to be associated with the individual vehicle. The contents of the memory device may be made accessible via the tablet computers for the convenience of maintenance and repair. Sensitive information can be stored in a trusted platform module (TPM) to render it secure and tamper-proof. In alternative embodiments, a vehicle-specific computer may manage all functions and data collection, and the tablets serve primarily as user interfaces with that computer.

A key feature of the invention is that, in preferred embodiments, each of the plurality of tablet computers can be configured to carry all of the programming necessary to the operation of the vehicle, so that each tablet is capable of performing the functions of any of the other tablets. The user is thereby enabled to customize the dashboard by selecting any of the plurality of tablets for display of any of the available GUI interface screens.

The tablet computers are provided with standard wireless communication hardware and protocols, such as 4G, 5G, Bluetooth, Wi-Fi, LoRa and/or NFC transceivers. For use in automobiles, the IEEE 802.3bw standard (automotive Ethernet) is preferably implemented as well. The weight savings associated with the physical layer of this standard (100 Mbit/s Ethernet over a single twisted pair) make this standard attractive for aircraft as well as automobiles. Ethernet also allows for flexible networking, accommodating, e.g., star topology and bus topology.

In preferred embodiments, one or more of these protocols are used to communicate with a wireless key fob or with a smartphone in possession of the user, in order to ensure that the user is an authorized operator of the vehicle. In certain embodiments, data may be communicated to and displayed on the smartphone, and certain control commands may be issued from the smartphone. Registration information identifying authorized users can be securely stored in the above-mentioned TPM. Different levels of access can be provided to different authorized users, for example authorized maintenance and repair technicians can be given a necessary level of access to systems and controls, but only a limited ability to operate the vehicle.

Wireless Internet access via standard browser software can be used for vehicle-specific purposes, such as navigation via consumer-level mapping and geo-locating websites. In sea-going craft and aircraft, specialized satellite and ground-based navigation system hardware (GPS, GNSS, VOR), and associated applications (e.g. SOTM, AIS, ECDIS) are likely to be installed in the vehicle; these will have communication ports that can interface, directly or via adapters, with the tablet computers, which will display the relevant maps, data, and control functions. Radars, lidars, cameras, and other sensor systems are likewise preferably interfaced with the tablet computers.

In principle, all vehicle controls can be operated via the tablets' touchscreens and GUIs. In practice, it will be preferred that the operator is provided with at least the basic manual vehicle controls (steering wheel, accelerator and brake pedals in the case of a automobile; a yoke or stick and rudder pedals in the case of an aircraft, etc.) Manual controls will generally be necessary to enable control in situations where autonomous operation is inadequate to the task, or in the event of failure of a tablet or the digital systems supporting it.

Another key feature of the invention is the reversible nature of the mounting of the tablets in the vehicle dashboard. Prior art GUI interfaces are implemented on built-in touchscreen devices that usually require a complex disassembly procedure if removal and replacement of the device becomes necessary. The present invention permits removal and replacement in a matter of minutes, with a simple attachment means and a single communications plug, typically a standard USB-3 connector. Power may be supplied via the same connector, or alternatively via a separate cable, depending on the design of the tablet.

FIG. 1 shows an embodiment in which three tablets 2a, 2b and 2c are horizontally deployed across a dashboard assembly 1, which is provided with cavities for holding the tablets. A charger cable with connector 3 is installed within the cavity so that the tablet can be charged when installed on the dashboard; depending upon the tablet design this cable and connector may also serve as the data I/O connection. Tablet 2b is shown tilted out, with cable connector 3 still attached to its charging/data port. In this configuration, removal of the tablet is a simple matter of disconnecting the connector and lifting the tablet out of the recess in which it was installed. Inserting a replacement tablet is a simple matter of reversing the procedure. The dashboard of the invention thus enables the use of standard tablets for display, command and control functions. The tablets can be removed for repair or replacement, for remote updating and re-programming of software, being immediately replaced with already-updated tablets, or for forensic inspection of data stored in the TPM.

Figure 2:
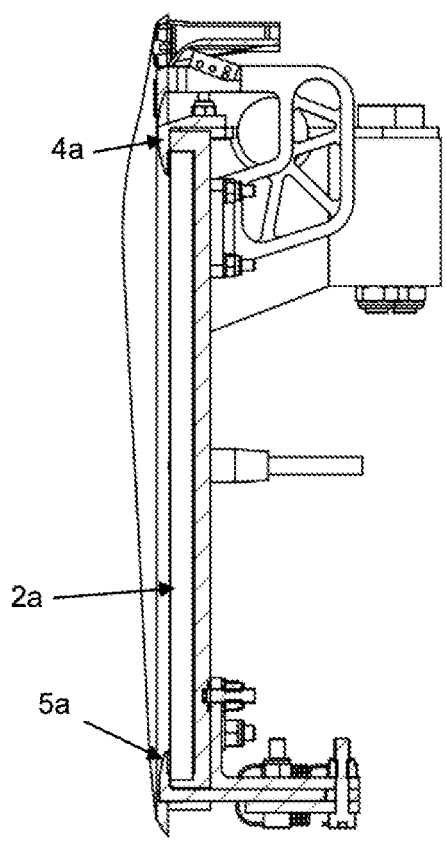
FIG. 2 is a cross-section illustrating the mounting of a tablet in the dashboard of FIG. 1.

FIG. 2 shows a cross-section through the dashboard assembly and tablet 2a, which rests behind spring-loaded retaining rail 5a and is held in place by spring-loaded clip 4a. The clips and rails preferably are equipped with protective strips of soft material, such as felt or elastomer) to protect the tablet screens. Clip 4a may only a few millimeters in breadth, but a more secure mounting may be provided if the width of clip 4a ranges from a centimeter to the full width of the tablet. Clip 4a is mounted on a hinge so that it can be rotated upward to release the upper edge of tablet 2a. The spring loading of the clip presses the tablet downward when mounted, securing the installation against shock and vibration. In alternative embodiments, the clip may be slidable upwards, or rotate clockwise or counter-clockwise rather than in an upward direction. A single clip, which enables one-hand operation, is preferred for ease of removal and installation of the tablet.

Figure 3:
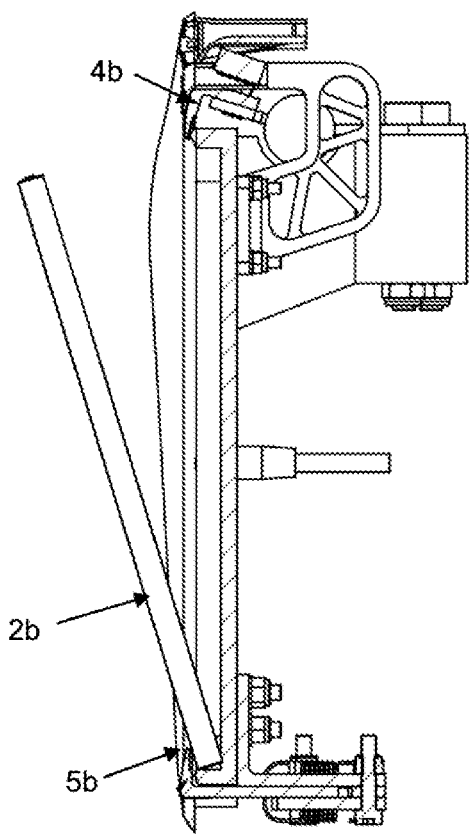
FIG. 3 is a cross-section illustrating the removal of a tablet from the dashboard of FIG. 1.

FIG. 3 shows a cross-section through the dashboard assembly and tablet 2b, which has been released from behind clip 4b and tilted forward. The lower edge of tablet 2b rests behind spring-loaded retaining rail 5b, and a slight outward motion of rail 5b permits the tablet to be rotated outward, prior to being lifted upward for removal. The construction of the mounting receptacles, rails, and clips is preferably identical for all three tablets, which are also preferably identical, at least in their outer dimensions.

Figure 4:
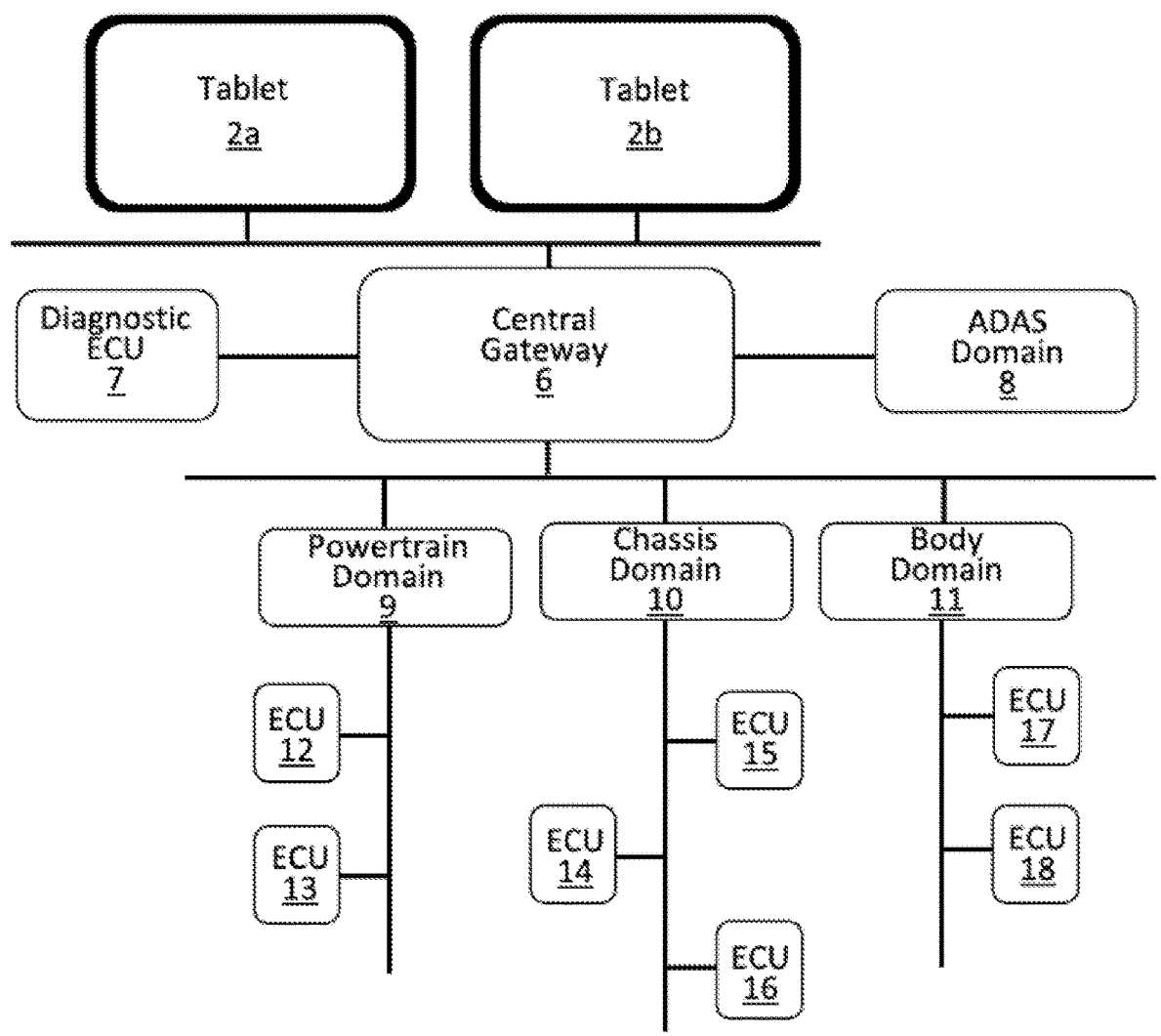
FIG. 4 is a representative vehicle network showing one embodiment of the invention.

FIG. 4 is an example of a vehicle CAN network using the tablets 2a and 2b of FIG. 1. The tablets are on a bus connected to the central gateway 6. The gateway is the central electronic control module for the vehicle's data network management, serving as a data router as well as a central computing unit between the vehicle's network domains and certain ECUs, and supporting the various bus systems that may be present. The embodiment shown in FIG. 4 illustrates a few of the numerous domains that may be present in an automobile employing the present invention. The gateway 6 is networked with the diagnostic ECU 7, which acquires, stores, and outputs data relating to the operation and performance of the vehicle's systems. This data may optionally be copied to the TPM of one or more of the tablets. Gateway 6 is also networked with the Advanced Driver Assistance Systems (ADAS) domain 8.

Through an Ethernet or CAN bus, the gateway communicates with other domains, including but not limited to the powertrain domain 9, chassis domain 10, and body domain 11. Each domain is a controller of a subnetwork of various ECUs, represented generically as ECUs 12-18. The number of domains and ECUs shown is a small subset of those likely to be present. In some embodiments, there may be multiples of these domains organized into zones, such as front left, front right, etc., as a means of reducing the complexity and weight of the wirinIn this embodiment, the tablet computers 2a and 2b serve as the interface with the operator of the vehicle, receiving and displaying sensor inputs, and dispatching commands to the various actuators that operate the vehicle's systems.

The embodiment employing spring-loaded clips, illustrated in the drawings and described above, is one of numerous possible embodiments. Other suitable mounting means include reversible adhesive strips and hook-and-loop fabric panels, threaded (and preferably captive) nuts, and magnets arranged to interact with magnetic elements of the tablets, which manufacturers often install for the attachment of pens, styluses, covers, keyboards, and/or wireless chargers. The spring-loaded clips may be replaced by magnetically-biased clips or elastomer-biased clips. Alternatively, the clips may have no biasing mechanism, but are constructed so as to be lockable into the closed configuration with a lever or rotating knob. In certain embodiments, the clips may incorporate keyed or electronic locks to prevent unauthorized removal of the tablets.

The number of tablets installed in a dashboard of the invention is at least two, but could be three or more in a typical personal vehicle. The number of tablets in the cockpit of a commercial airliner, or the bridge of a passenger ship, could be on the order of a dozen or more.

EXAMPLE

The tablet software that implements the invention can be downloaded and installed on a tablet computer by standard methods. Subsequent updates and upgrades can be manually or automatically installed. By way of example, a tablet application providing the above-described functionality is constructed using the Unity™ cross-platform engine (Unity Technologies, Copenhagen, Denmark.) The software is hosted in a data repository owned the developer. An authorized user, having the correct credentials, downloads the repository to a computer running an appropriate version of Unity™ 3D.

As a demonstration, the invention has been implemented on a Samsung Galaxy™ Tab S8 11-inch 128 GB Wi-Fi Tablet (Samsung Electronics Co. Ltd., Suwon, South Korea) running the Android operating system. The user downloads and opens the application in Unity 3D, and via the "Build" operation generates an .apk file. The .apk file is then transferred to an appropriate tablet computer. Running the .apk file displays instructions for installing the application on the tablet. It is contemplated that any adequately-equipped tablet will be suitable for use with the invention. It will be understood that a comparable application can be written for tablets running other operating systems, for example the application may be installed via an .ipa file on an Apple iPad™ (Apple Inc., Cupertino, California) tablet. All such implementations are within the scope of the invention.

The invention has been described and illustrated by way of specific embodiments, but is not limited to these illustrative examples. Alternatives and equivalents of various aspects and components of the invention will be apparent to those of skill in the art, and such modifications are contemplated to be within the scope of the invention, which is limited only by the claims. The claims encompass any and all such equivalents, other than any that have been explicitly disclaimed by the applicant.

We claim:

1. A dashboard for a vehicle comprising a plurality of touchscreen-equipped tablet computers, the tablet computers being:
    (a) reversibly mounted in the dashboard,
    (b) in communication with one or more electronic control units (ECUs) present in the vehicle,
    (c) programmed to serve as touch controls for the operation of a plurality of the vehicle's systems, and
    (d) programmed to serve as readouts of the vehicle's sensors.

2. The dashboard according to claim 1, wherein one or more of the tablet computers is further programmed to carry out the functions of one or more ECUs not present in the vehicle.

3. The dashboard according to claim 2, wherein one or more of the tablet computers is further programmed to carry out the functions of a navigation system.

4. The dashboard according to claim 3, wherein the vehicle is an automobile, truck, or bus.

5. The dashboard according to claim 3, wherein the vehicle is an aircraft.

6. The dashboard according to claim 2, wherein the vehicle is an automobile, truck, or bus.

7. The dashboard according to claim 2, wherein the vehicle is an aircraft.

8. The dashboard according to claim 1, wherein one or more of the tablet computers is further programmed to carry out the functions of a navigation system.

9. The dashboard according to claim 8, wherein one or more of the tablet computers is further programmed to carry out the functions of a navigation system.

10. The dashboard according to claim 9, wherein the vehicle is an automobile, truck, or bus.

11. The dashboard according to claim 9, wherein the vehicle is an aircraft.

12. The dashboard according to claim 8, wherein the vehicle is an automobile, truck, or bus.

13. The dashboard according to claim 8, wherein the vehicle is an aircraft.

14. The dashboard according to claim 1, wherein the vehicle is an automobile, truck, or bus.

15. The dashboard according to claim 1, wherein the vehicle is an aircraft.

* * * * *